United States Patent
Lin et al.

(10) Patent No.: US 11,990,836 B2
(45) Date of Patent: May 21, 2024

(54) POWER SUPPLY UNIT AND POWER SUPPLY SYSTEM WITH DYNAMIC CURRENT SHARING

(71) Applicant: DELTA ELECTRONICS, INC., Taoyuan (TW)

(72) Inventors: Chi-Hung Lin, Taoyuan (TW); Guo-Hua Wang, Taoyuan (TW); Yu-Jie Lin, Taoyuan (TW); Hsien-Kai Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 262 days.

(21) Appl. No.: 17/713,614

(22) Filed: Apr. 5, 2022

(65) Prior Publication Data

US 2023/0147990 A1    May 11, 2023

(30) Foreign Application Priority Data

Nov. 5, 2021 (CN) .......................... 202111306738.7

(51) Int. Cl.
*H02M 3/04* (2006.01)
*H02M 1/00* (2006.01)

(52) U.S. Cl.
CPC ........... *H02M 3/04* (2013.01); *H02M 1/0009* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247;

(Continued)

(56) References Cited

U.S. PATENT DOCUMENTS

| 4,635,178 A * | 1/1987 | Greenhalgh | .......... H02M 3/285 363/71 |
| 6,894,466 B2 * | 5/2005 | Huang | ................ H02M 3/1584 323/272 |
| 2023/0412075 A1 * | 12/2023 | Zhou | ................... H02M 1/0022 |

FOREIGN PATENT DOCUMENTS

CN    111857313 A    10/2020

* cited by examiner

*Primary Examiner* — Kevin J Comber
*Assistant Examiner* — Nusrat Quddus
(74) *Attorney, Agent, or Firm* — Muncy, Geissler, Olds & Lowe, P.C.

(57) ABSTRACT

A power supply system with dynamic current sharing includes a current-sharing bus and a plurality of power supply units connected to each other through the current-sharing bus. The current-sharing bus provides a first current signal. Each power supply unit includes a local current bus for providing a second current signal. The active current-sharing unit compares the first current signal with the second current signal to generate a compensation voltage. The current-averaging unit compares a difference value between an average value of the first current signal and an average value of the second current signal to generate an average voltage. The droop current unit receives the second current signal to generate a droop compensation voltage. The integration calculation unit makes output currents of the power supply units be approximately equal according to the compensation voltage, the average voltage, and the droop compensation voltage.

14 Claims, 5 Drawing Sheets

(58) Field of Classification Search
CPC .......... G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/07; H02M 3/073; H02M 2003/071; H02M 2003/072; H02M 2003/075; H02M 2003/076; H02M 2003/077; H02M 2003/078; H02M 2001/0048; H05B 39/048; B23K 11/24; H04B 2215/069; Y02B 70/1491; H02J 3/46; H02J 3/38
See application file for complete search history.

POWER SUPPLY UNIT AND POWER SUPPLY SYSTEM WITH DYNAMIC CURRENT SHARING

BACKGROUND

Technical Field

The present disclosure relates to a power supply unit and a power supply system with dynamic current sharing, and more particularly to a power supply unit and a power supply system with continuous and fast dynamic current sharing for an output current of a load.

Description of Related Art

The statements in this section merely provide background information related to the present disclosure and do not necessarily constitute prior art.

With the development of the Internet and the increasing demand for computing, the functions and performance of the central processing unit (CPU) and graphics processing unit (GPU), which act as the basic computing engine, are becoming more and more powerful. As a result, the dynamic load changes of the system become more and more severe so the dynamic load current-sharing performance of the power supply becomes more important.

Please refer to FIG. 1, which shows a schematic waveform of the dynamic load test for a graphic processing unit. The continuous dynamic load waveform (i.e., electric data peak processing, EDPP) shown in FIG. 1 may show: the peak load (or maximum load) can reach to more than 200% of the rated load, and the time duration is less than 200 μs (that is, the time length of T1). At T2 (less than 1 ms), it is 150% of the rated load. Therefore, the dynamic load state sequentially descends.

For parallel-connected power supply units (PSUs), when the above-mentioned EDPP is used for load testing, if only the general current-sharing technology is used, the uneven (not equal) output currents of the power supply units will easily occur.

For example, multiple power supply units are connected to the system load by connecting outputs thereof together to supply power to the system load. If only the general active current-sharing technology is used, a current-sharing bus is provided to connect between multiple power supply units, and by subtracting the signal on the current-sharing bus with the current detection signal inside the power supply unit, the output voltage of the power supply unit with lower output current is increased to achieve the purpose of current sharing, thereby achieving the accurate current-sharing performance under the stable load. However, its disadvantage is that it is unable to provide instant (quick) load response for continuous dynamic load conditions.

Specifically, the active current sharing is achieved by comparing the current signal $I_{SHARE\_BUS}$ of the current-sharing bus with the current signal $I_{LOCAL\_BUS}$ of each power supply unit (i.e., the current subtraction). In particular, the current signal of the current-sharing bus is the maximum output current of the plurality of power supply units (or a current signal that is directly proportional to the maximum output current). According to the comparison of the two currents, therefore, the difference between the output current of each power supply unit and the maximum output current of all power supply units (i.e., $I_{SHARE\_BUS}-I_{LOCAL\_BUS}$) can be realized. Furthermore, the error amount (i.e., the current difference) after the subtraction of the two currents is generated through a controller (for example, but not limited to, a PI (proportional-integral) controller) to generate a voltage increase, and then the voltage increase is provided to the reference voltage so that the output current of the power supply unit can be increased to achieve the effect of current sharing. Under continuous dynamic load operation, $I_{SHARE\_BUS}$ and $I_{LOCAL\_BUS}$ will vary with the load conditions, which is limited by the signal response speed and the controller bandwidth. Therefore, when the load changes (variations) more drastically, the voltage compensation speed will not be able to catch up with the load changes, resulting in poor dynamic current-sharing performance.

In addition, another general current-sharing technology is called droop current-sharing technology. For the droop current-sharing technology, there is no need to connect all the power supply units with the current-sharing bus as the previously-disclosed active current-sharing technology, only the internal current signal of each power supply unit is used. The principle is that the output voltage of the power supply unit will decrease as the loading becomes larger, as shown in FIG. 6A. Therefore, through the droop current-sharing technology, the output voltage can be naturally changed in response to changes in the load conditions, thereby achieving the purpose of current sharing. In usual, the circuit is realized by using an operational amplifier (OPA) and a current-sensing resistor. The differential amplifier circuit composed of the operational amplifier amplifies the voltage difference generated by the load current through the current-sensing resistor, and then adds this amplified signal to the voltage feedback circuit, that is, when the load current increases, the output voltage decreases; when the load current decreases, the output voltage increases.

In general, the droop current-sharing technology is mostly used in the power over Ethernet (PoE) system. Since the output voltage of the power supply device (i.e., the power supply unit) of the PoE system is relatively high (usually 54 volts), and the voltage may vary widely, therefore, through a simple droop current-sharing technology, the current sharing (uniformity in current) can be achieved. However, its disadvantage is that in order to achieve a high accuracy (precision) current-sharing effect, the droop slope must be large, but the load regulation of the output voltage will be sacrificed. In addition, since the accuracy of the droop slope must be high, the design requirements are more stringent. In other words, it is relatively difficult to design a droop slope to achieve both a good current-sharing effect and load regulation rate.

SUMMARY

An object of the present disclosure is to provide a power supply unit to solve the problems of the existing technology.

In order to achieve the object, the power supply unit includes a power converter, a current detection circuit, a detection signal peripheral circuit, and a control processor. The power converter provides an output current and an output voltage. The current detection circuit detects the output current, and provides a current signal corresponding to the magnitude of the output current. The detection signal peripheral circuit receives the output voltage, the current signal, and a current-sharing bus signal, and respectively converts the output voltage, the current-sharing bus signal, and the current signal into an output voltage signal, a first current signal, and a second current signal. The control processor receives the output voltage signal, the first current signal, and the second current signal, and performs an active current-sharing control, a current-averaging error compensation control, and a droop current control according to the output voltage signal, the first current signal, and the second current signal so as to generate a control signal to control the output voltage and adjust the magnitude of the output current.

Accordingly, the active current-sharing control, the average current difference compensation control, and the droop current-sharing control are integrated/combined to acquire the advantages of each current sharing control, that is, achieving continuous and fast dynamic current sharing for the output current of the load, and increasing voltage compensation speed and current sharing accuracy so that the output currents of the parallel-connected power supply units are approximately equal to implement the optimized current-sharing effect.

Another object of the present disclosure is to provide a power supply system with dynamic current sharing to solve the problems of the existing technology.

In order to achieve the object, the power supply system with dynamic current sharing includes a current-sharing bus and a plurality of power supply units. The current-sharing bus provides a first current signal. The plurality of power supply units connected to each other through the current-sharing bus. Each power supply unit includes a local current bus for providing a second current signal. Each power supply unit includes a control processor. The control processor includes an active current-sharing unit, an average current unit, a droop current unit, and an integration calculation unit. The active current-sharing receives the first current signal and the second current signal, and compares the second current signal with the first current signal to generate a compensation voltage. The average current unit receives the first current signal and the second current signal, and compares an average value of the first current signal with an average value of the second current signal to generate an average voltage. The droop current unit receives the second current signal to generate a droop compensation voltage. The integration calculation unit receives the compensation voltage, the average voltage, and the droop compensation voltage to make output currents of the power supply units be approximately equal according to the compensation voltage, the average voltage, and the droop compensation voltage.

Accordingly, the active current-sharing control, the average current difference compensation control, and the droop current-sharing control are integrated/combined to acquire the advantages of each current sharing control, that is, achieving continuous and fast dynamic current sharing for the output current of the load, and increasing voltage compensation speed and current sharing accuracy so that the output currents of the parallel-connected power supply units are approximately equal to implement the optimized current-sharing effect.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
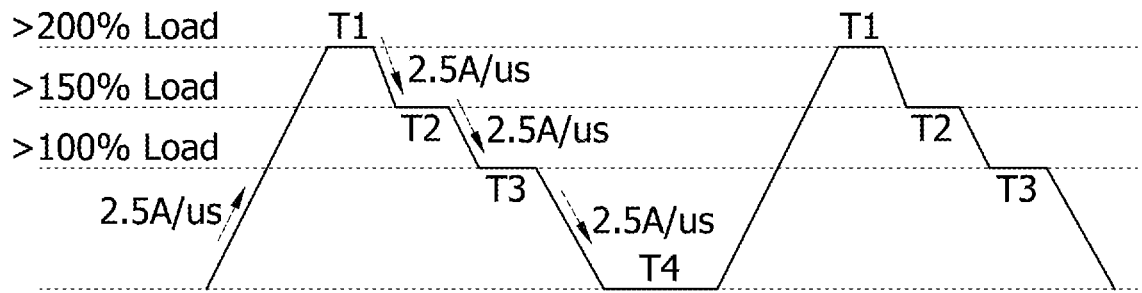
FIG. 1 is a schematic waveform of the dynamic load test for a graphic processing unit.

Reference will now be made to the drawing figures to describe the present disclosure in detail. It will be understood that the drawing figures and exemplified embodiments of present disclosure are not limited to the details thereof.

The power supply system with dynamic current sharing disclosed in the present disclosure may be applied to, for example, but not limited to, power supplies in related fields such as servers, networking, etc., for example, multiple power supplies connected in parallel are used as a redundant power supply architecture.

Moreover, the present disclosure introduces existing current-sharing technology, including the active current-sharing control, the average current difference compensation control, and the droop current-sharing control, which are integrated/combined to acquire the advantages of each current sharing control, that is, achieving continuous and fast dynamic current sharing for the output current of the load, and increasing voltage compensation speed and current sharing accuracy. Hereinafter, the current-sharing control of the present disclosure will be described in detail.

Figure 2:
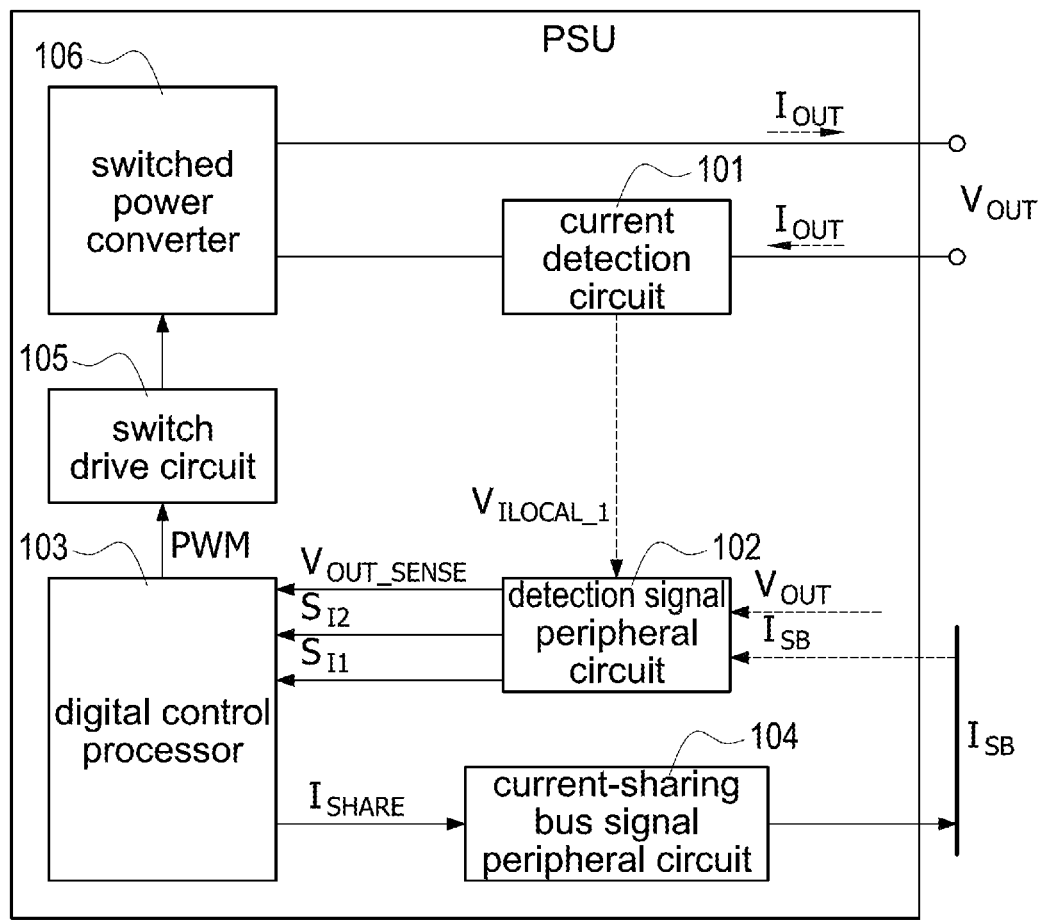
FIG. 2 is a block diagram of a single power supply unit of a power supply system according to the present disclosure.

Please refer to FIG. 2, which shows a block diagram of a single power supply unit of a power supply system according to the present disclosure. The single power supply unit $PSU_1$-$PSU_N$ includes a current detection circuit 101, a detection signal peripheral circuit 102, a digital control processor 103, a current-sharing bus signal peripheral circuit 104, a switch drive circuit 105, and a switched power converter 106. Please refer to FIG. 3, multiple power supply units are used in parallel as a redundant power supply architecture. In this embodiment, two power supply units $PSU_1$-$PSU_2$ are taken as an example but not for limitation of the present disclosure. In this parallel-connected system, output voltages $V_{OUT}$ of all power supply units $PSU_1$-$PSU_2$ are connected in parallel. The first power supply unit $PSU_1$ provides a first output current Iout1 and the second power supply unit $PSU_2$ provides a second output current Iout2 to commonly provide a total output current Tout total to supply power to a load of the system. In addition, the power supply units $PSU_1$-$PSU_2$ are connected to each other through a current-sharing bus $I_{SB}$.

Please refer to FIG. 2 again, the current detection circuit 101 is used to detect the output current Tour of the power supply unit PSU (i.e., a load current), and provides a current signal $V_{ILOCAL\_1}$ of amplifying the output current $I_{OUT}$. In practice, the current detection circuit 101 may be, for example, but not limited to, a resistive component, and therefore the output current $I_{OUT}$ flowing through a resistance value R of the resistive component (such as a resistor) generates a voltage difference (Vsense=Iout*R). A differential amplifier circuit composed of OPA may detect the magnitude of the voltage difference (corresponding to the output current $I_{OUT}$), which represents the amplified current signal $V_{ILOCAL\_1}$.

The detection signal peripheral circuit 102 is used to receive three detection signals, including the output voltage $V_{OUT}$, the current-sharing bus $I_{SB}$, and the amplified current signal $V_{ILOCAL\_1}$ (corresponding to the output current $I_{OUT}$ of the power supply unit). Moreover, the detection signal peripheral circuit 102 adjusts (for example, steps down) the received detection, and provides the adjusted detection signal to the digital control processor 103 to meet the voltage level (magnitude) that the digital control processor 103 can operate. In other words, after processing by the detection signal peripheral circuit 102, the output voltage $V_{OUT}$ is step down (reduced) to $V_{OUT\_SENSE}$, the current signal $V_{ILOCAL\_1}$ is step down (reduced) to the second current signal $S_{I21}$-$S_{I2N}$, and the current-sharing bus signal $I_{SB}$ is step down (reduced) to the first current signal $S_{I1}$.

The digital control processor 103 digitally filters the second current signal $S_{I2}$ (i.e., the local current detection signal), and calculates the filtered second current signal $S_{I2}$ to generate the corresponding current-sharing signal $I_{SHARE}$ to the current-sharing bus signal peripheral circuit 104. The current-sharing bus signal peripheral circuit 104 amplifies the current-sharing signal $I_{SHARE}$ and provides the amplified current-sharing signal $I_{SHARE}$ to the current-sharing bus $I_{SB}$ connected to the current-sharing bus signal peripheral circuit 104. Incidentally, since the current signal on the current-sharing bus $I_{SB}$ is the maximum output current of all power supply units, when all power supply units provide (transmit) the amplified current-sharing signals $I_{SHARE}$ to the current-sharing bus signal peripheral circuit 104, the current-sharing bus $I_{SB}$ reserves the maximum output current as the current signal of the current-sharing bus $I_{SB}$.

The digital control processor 103 performs an active current-sharing control, an average current difference compensation control, and a droop current-sharing control inside the processor according to the output voltage signal $V_{OUT\_SENSE}$, the second current signal $S_{I21}$-$S_{I2N}$, and the first current signal $S_{I1}$ provided by the detection signal peripheral circuit 102 to generate the corresponding reference voltage command and PWM control signal (the detailed description will be made as follows). Therefore, the switch drive circuit 105 is used to control the output voltage $V_{OUT}$ of the switched power converter 106, i.e., the output voltage $V_{OUT}$ of the power supply unit, thereby achieving continuous and fast dynamic current sharing for the output current of the load.

Figure 3:
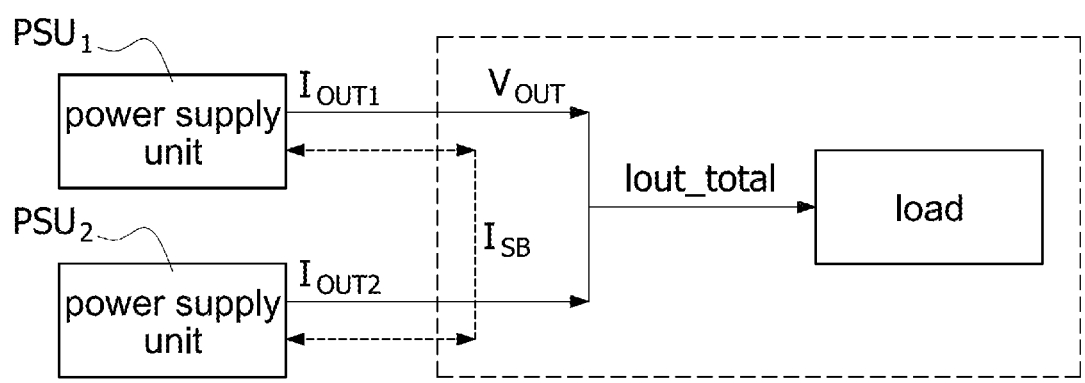
FIG. 3 is a schematic block diagram of multiple parallel-connected power supply units of the power supply system according to the present disclosure.
Figure 4:
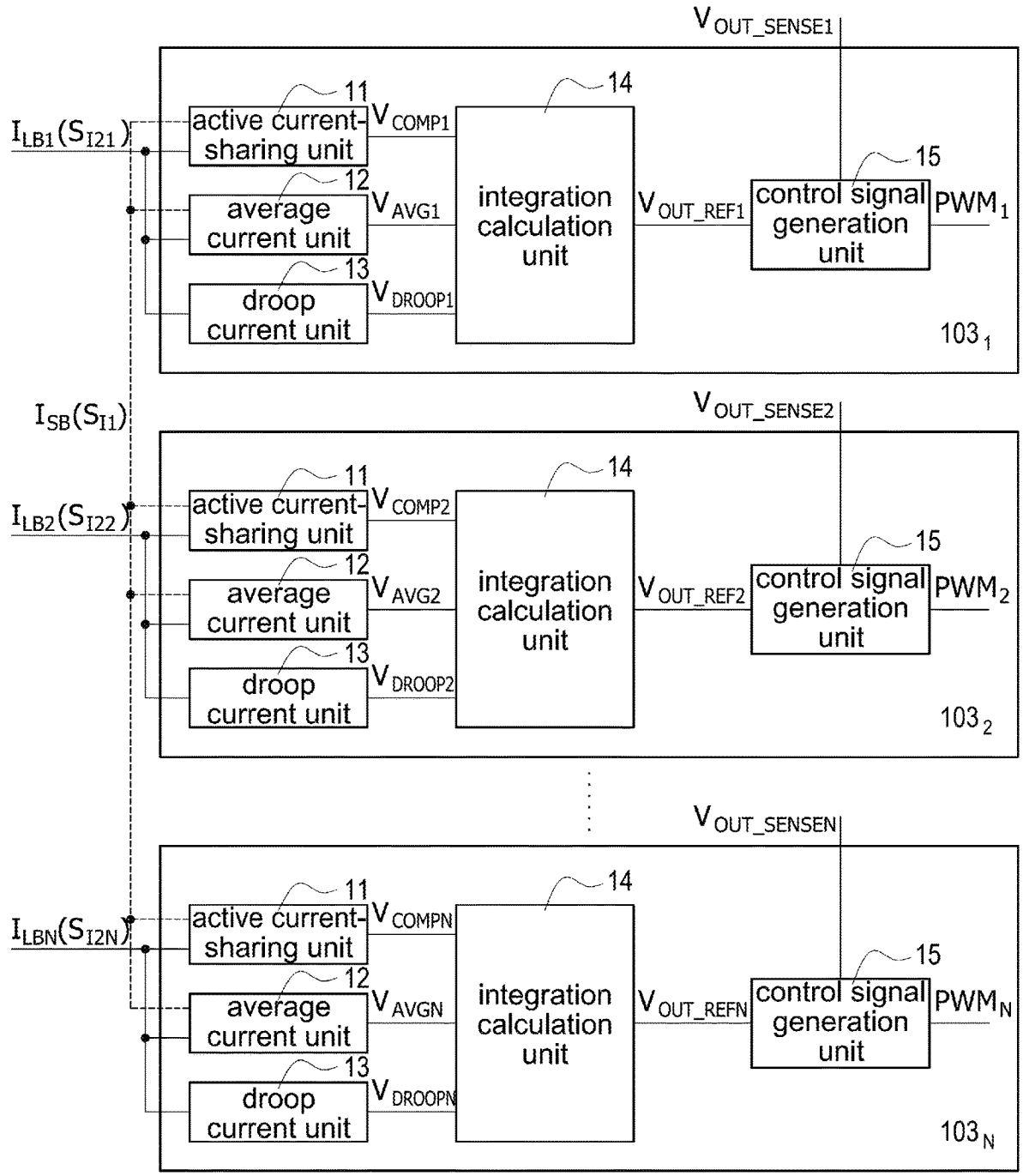
FIG. 4 is a block diagram of control processors of the power supply system to perform a dynamic current sharing according to the present disclosure.

Please refer to FIG. 4, which shows a block diagram of control processors of the power supply system to perform a dynamic current sharing according to the present disclosure, and also refer to FIG. 3. The power supply system includes a current-sharing bus $I_{SB}$ and a plurality of a plurality of power supply units $PSU_1$-$PSU_N$. The current-sharing bus $I_{SB}$ provides a first current signal $S_{I1}$. The power supply units $PSU_1$-$PSU_N$ are connected to each other through the current-sharing bus $I_{SB}$. A digital control processor $103_1$-$103_N$ of each power supply unit $PSU_1$-$PSU_N$ includes an active current-sharing unit 11, an average current unit 12, a droop current unit 13, and an integration calculation unit 14. A plurality of local current bus $I_{LB1}$-$I_{LBN}$ correspondingly provide the second current signals $S_{I21}$-$S_{I2N}$. That is, a current signal of the output current provided by the local current bus $I_{LB1}$ of the first power supply unit $PSU_1$ is the first current signal $S_{I21}$, a current signal of the output current provided by the local current bus $I_{LB2}$ of the second power supply unit $PSU_2$ is the second current signal $S_{I22}$, and so on, and the detail description is omitted here for conciseness. The digital control processor 103 receives the output voltage signals $V_{OUT\_SENSE1}$-$V_{OUT\_SENSEN}$, the first current signal Sn, and the second current signals $S_{I21}$-$S_{I2N}$ provided from the detection signal peripheral circuit 102 shown in FIG. 2.

As shown in FIG. 4, the active current-sharing unit 11 of each power supply unit $PSU_1$-$PSU_N$ receives the first current signal Sn and the second current signal $S_{I21}$-$S_{I2N}$, and compares the second current signal $S_{I21}$-$S_{I2N}$ with the first current signal Su to generate the compensation voltage $V_{COMP1}$-$V_{COMPN}$. Specifically, the first power supply unit $PSU_1$ receives the first current signal Sn provided by the current-sharing bus $I_{SB}$ and the second current signal $S_{I21}$ provided by the first local current bus $I_{LB1}$. The second power supply unit $PSU_2$ receives the first current signal $S_{I1}$ provided by the current-sharing bus $I_{SB}$ and the second current signal $S_{I22}$ provided by the second local current bus $I_{LB2}$, and so on. The $N^{th}$ power supply unit $PSU_N$ receives the first current signal $S_{I1}$ provided by the current-sharing bus $I_{SB}$ and the second current signal $S_{I2N}$ provided by the $N^{th}$ local current bus $I_{LBN}$. In particular, the magnitude of the first current signal $S_{I1}$ provided by the shared (commonly-used) current-sharing bus $I_{SB}$ is equal to the maximum value of the second current signals $S_{I21}$-$S_{I2N}$. That is, the current signal (i.e., the first current signal $S_{I1}$) provided by the current-sharing bus $I_{SB}$ corresponds to the maximum output current $I_{OUT}$ of all power supply units $PSU_1$-$PSU_N$.

Figure 5:
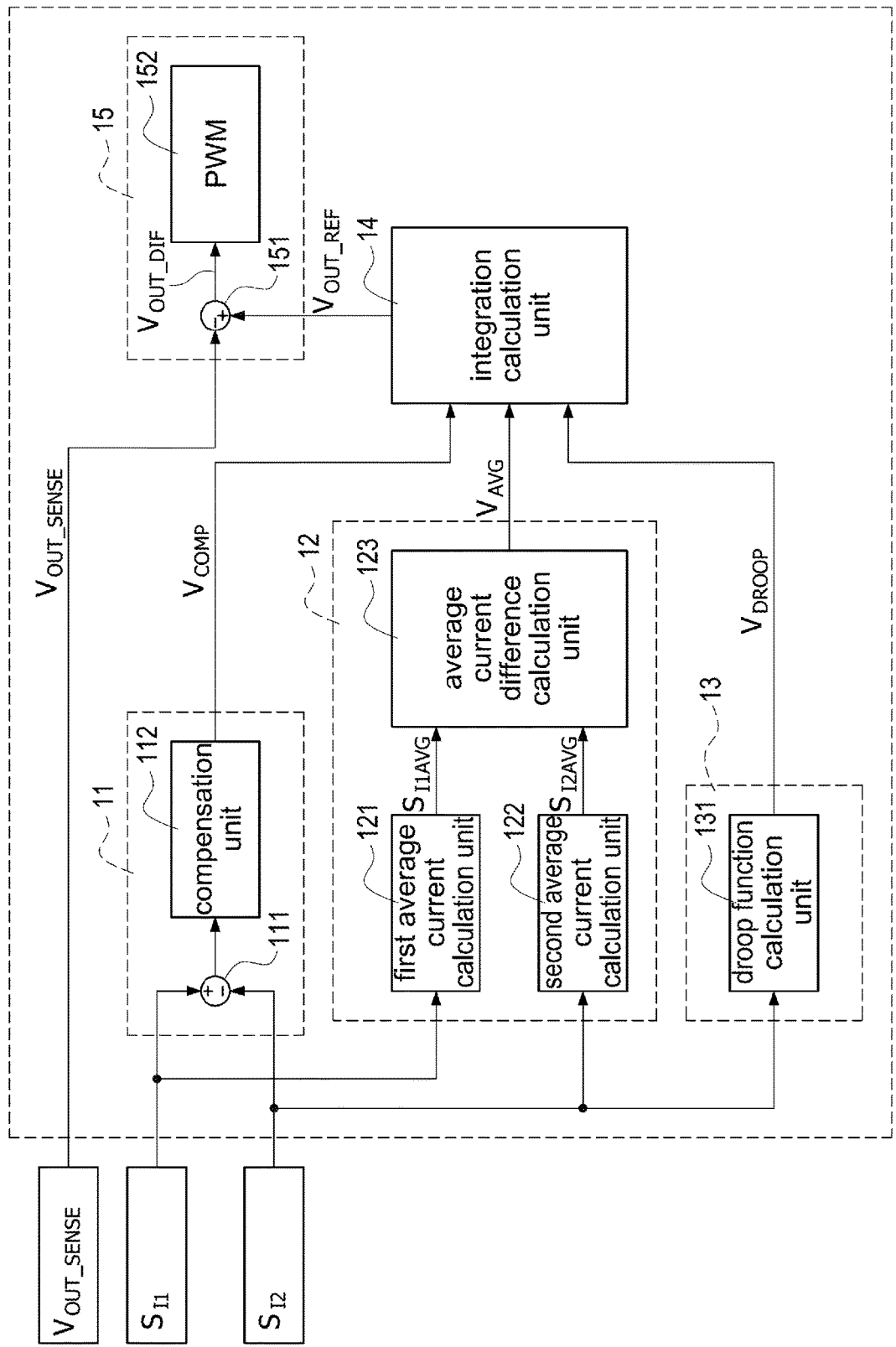
FIG. 5 is a detailed block diagram of the control processor of the power supply unit according to the present disclosure.

Please refer to FIG. 5, which shows a detailed block diagram of the control processor of the power supply unit according to the present disclosure. The active current-sharing unit 11 includes a voltage comparison unit 111 and a compensation unit 112. The voltage comparison unit 111 receives the first current signal Sn and the second current signal $S_{I21}$-$S_{I2N}$, and subtracts the second current signal $S_{I21}$ from the first current signal $S_{I1}$ (take the first power supply unit $PSU_1$ as an example) so as to acquire/realize a current difference $I_{DIF}$ between the output current $I_{OUT1}$-$I_{OUTN}$ of each power supply unit $PSU_1$-$PSU_N$ and the maximum output current of all power supply units $PSU_1$-$PSU_N$. Furthermore, the compensation unit 112 is used to calculate the current difference $I_{DIF}$. In one embodiment, the compensation unit 112 may be a digital controller, for example, but not limited to, a proportional-integral (PI) controller to generate the compensation voltages $V_{COMP1}$-$V_{COMPN}$. Therefore, when the current difference between the first current signal Sn and the second current signal $S_{I21}$ is larger, the active current-sharing unit 11 provides a larger compensation voltage; otherwise, it provides a smaller compensation voltage. Incidentally, since the first current signal $S_{I1}$ corresponds to the maximum output current, the aforementioned current value subtraction calculation is the difference acquiring by subtracting the second current signal $S_{I21}$ from the first current signal Sri.

As shown in FIG. 4, the average current unit 12 receives the first current signal Su and the second current signal $S_{I21}$-$S_{I2N}$, respectively calculates an average value of the first current signal $S_{I1}$ as a first current average value SHAW; and an average value of the second current signal $S_{I21}$-$S_{I2N}$ as a second current average value $S_{I21AVG}$-$S_{I2NAVG}$, and calculates a difference value between the first current average value $S_{f1AVG}$ and the second current average value $S_{f21AVG}$-$S_{f2NAVG}$ to generate the average voltage $V_{AVG1}$-$V_{AVGN}$.

Specifically, as shown in FIG. 5, the average current unit 12 includes a first average current calculation unit 121, a second average current calculation unit 122, and an average current difference calculation unit 123. The first average current calculation unit 121 receives the first current signal $S_{f1}$, and calculates an average value of the first current signal $S_{f1}$ as a first current average value $S_{f1AVG}$. The second average current calculation unit 122 receives the second current signal $S_{f21}$-$S_{f2N}$, and calculates an average value of the second current signal $S_{f21}$-$S_{f2N}$ as a second current average value $S_{f21AVG}$-$S_{f2NAVG}$. The average current difference calculation unit 103 receives the first current average value $S_{f1AVG}$ and the second current average value $S_{f21AVG}$ (take the first power supply unit $PSU_1$ as an example), and calculate a difference value between the first current average value $S_{f1AVG}$ and the second current average value $S_{f21AVG}$ to generate the average voltage $V_{AVG1}$. In particular, the main purpose of average current compensation is to help parallel-connected power supply units to compensate the average voltage error caused by the current detection and the active current-sharing delay in the continuous dynamic load.

Figure 6A:
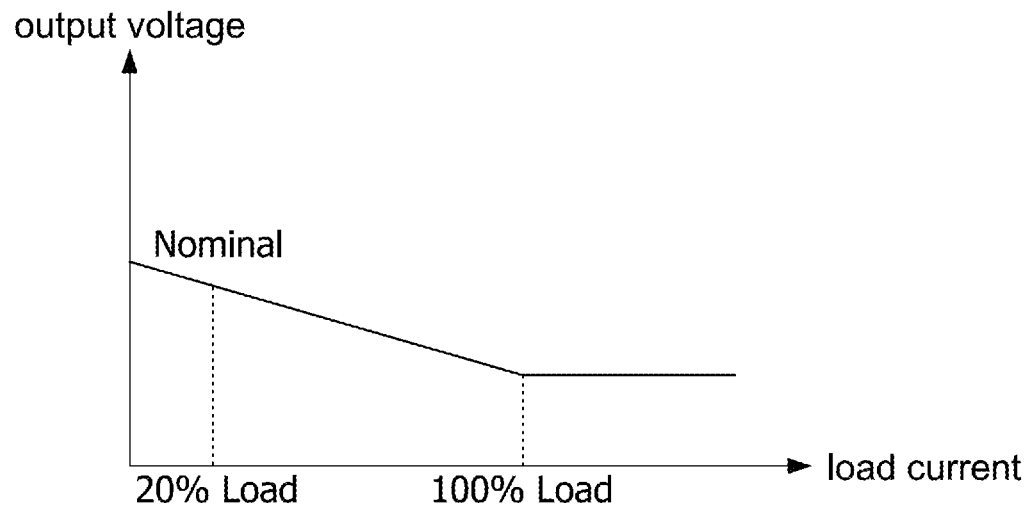
FIG. 6A is a waveform designed for the slope of load current and output voltage used in traditional droop current sharing.
Figure 6B:
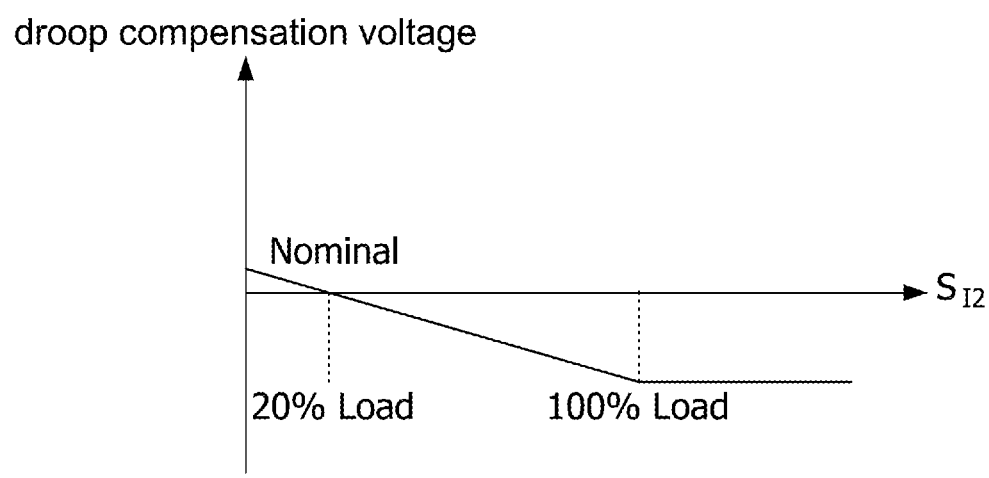
FIG. 6B is a waveform designed for the slope of load current and output voltage used in droop current sharing of the present disclosure.

As shown in FIG. 4, the droop current unit 13 receives the second current signal $S_{f21}$-$S_{f2N}$ to generate the droop compensation voltage $V_{DROOP1}$-$V_{DROOPN}$. Specifically, as shown in FIG. 5, the droop current unit 13 includes a droop function calculation unit 131. The droop function calculation unit 131 receives the second current signal $S_{f21}$-$S_{f2N}$ to generate the droop compensation voltage $V_{DROOP1}$-$V_{DROOPN}$ according to the magnitude of the second current signal $S_{f21}$-$S_{f2N}$. Please refer to FIG. 6B, the voltage compensation effect is implemented by the local current detection signal of the power supply unit $PSU_1$-$PSU_N$, i.e., the design of the second current signal $S_{f21}$-$S_{f2N}$ and the droop compensation voltage $V_{DROOP1}$-$V_{DROOPN}$. For the droop current unit 13, it only receives the second current signal $S_{f21}$-$S_{f2N}$ provided by the local current bus $I_{LB1}$-$I_{LBN}$, and does not involve the first current signal $S_{f1}$ of the current sharing bus $I_{SB}$. Also, according to the built-in (designed) droop slope of the power supply unit $PSU_1$-$PSU_N$ itself, the magnitude of the output voltage that changes due to the variation of the load can be adjusted (adjusted). Therefore, the droop current sharing can improve the response speed of dynamic load transient current sharing.

As shown in FIG. 4, the integration calculation unit 14 receives the compensation voltage $V_{COMP1}$-$V_{COMPN}$, the average voltage $V_{AVG1}$-$V_{AVGN}$, and the droop compensation voltage $V_{DROOP1}$-$V_{DROOPN}$. Further, the integration calculation unit 14 generates a reference voltage $V_{OUT\_REF1}$-$V_{OUT\_REFN}$ to control the output voltage $V_{OUT\_SENSE1}$-$V_{OUT\_SENSEN}$ of the average voltage $V_{AVG1}$-$V_{AVGN}$ according to the compensation voltage $V_{COMP1}$-$V_{COMPN}$, the average voltage $V_{AVG1}$-$V_{AVGN}$, and the droop compensation voltage $V_{DROOP1}$-$V_{DROOPN}$ so as to dynamically current share the output currents $I_{OUT1}$-$I_{OUTN}$ of the power supply units $PSU_1$-$PSU_N$.

Please refer to FIG. 5, the power supply unit $PSU_1$-$PSU_N$ further includes a control signal generation unit 15. The control signal generation unit 15 includes an output voltage comparison unit 151 and a control signal generator 152. Specifically, the reference voltage $V_{OUT\_REF1}$-$V_{OUT\_REFN}$ generated from the integration calculation unit 14 and the output voltage $V_{OUT\_SENSE1}$-$V_{OUT\_SENSEN}$ of the power supply unit $PSU_1$-$PSU_N$ are provided to the output voltage comparison unit 151, and the output voltage comparison unit 151 compares the output voltage $V_{OUT\_SENSE1}$-$V_{OUT\_SENSEN}$ with the reference voltage $V_{OUT\_REF1}$-$V_{OUT\_REFN}$ (i.e., the voltage subtraction between the output voltage $V_{OUT\_SENSE1}$-$V_{OUT\_SENSEN}$ and the reference voltage $V_{OUT\_REF1}$-$V_{OUT\_REFN}$) to acquire an output voltage difference $V_{OUT\_DIF}$. The control signal generator 152 receives the output voltage difference $V_{OUT\_DIF}$ to generate a control signal PWM according to the output voltage difference $V_{OUT\_DIF}$, and the control signal PWM is provided to control at least one switch component (not shown) of the switched power converter 106 (shown in FIG. 2) through the switch drive circuit 105 so as to control the output voltage $V_{OUT}$ of the switched power converter 106, i.e., the output voltage $V_{OUT}$ of the power supply unit $PSU_1$-$PSU_N$, thereby achieving continuous and fast dynamic current sharing for the output current of the load.

In summary, the present disclosure has the following features and advantages:
1. The active current-sharing control, the average current difference compensation control, and the droop current-sharing control are integrated/combined to acquire the advantages of each current sharing control, that is, achieving continuous and fast dynamic current sharing for the output current of the load, and increasing voltage compensation speed and current sharing accuracy so that the output currents of the parallel-connected power supply units are approximately equal (for example, the average error between two output currents is less than 5% of the total output current) to implement the optimized current-sharing effect.
2. The active current-sharing control is used to increase the output voltage by acquiring the current difference between the current of the current-sharing bus and the current of the local current bus.
3. The average current difference compensation control is used to help parallel-connected power supply units to compensate the average voltage error caused by the current detection and the active current-sharing delay in the continuous dynamic load, thereby achieving more accurate current-sharing effect according to the compensated average voltage.
4. The droop current-sharing control is used to improve the response speed of dynamic load transient current sharing.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:
1. A power supply unit, comprising:
a power converter, configured to provide an output current and an output voltage,
a current detection circuit, configured to detect the output current, and provide a current signal corresponding to the magnitude of the output current,
a detection signal peripheral circuit, configured to receive the output voltage, the current signal, and a current-sharing bus signal, and respectively convert the output voltage, the current-sharing bus signal, and the current signal into an output voltage signal, a first current signal, and a second current signal, and a control processor, configured to receive the output voltage signal, the first current signal, and the second current signal, and perform an active current-sharing control, a current-averaging error compensation control, and a droop current control according to the output voltage signal, the first current signal, and the second current signal so as to generate a control signal to control the output voltage and adjust the magnitude of the output current.

2. The power supply unit as claimed in claim 1, wherein the detection signal peripheral circuit is a step-down circuit, and the detection signal peripheral circuit is configured to respectively step down the output voltage, the current-sharing bus signal, and the current signal into the output voltage signal, the first current signal, and the second current signal.

3. The power supply unit as claimed in claim 1, further comprising:
    a current-sharing bus signal peripheral circuit,
    wherein the control processor is configured to digitally filter the second current signal to provide a current-sharing signal to the current-sharing bus signal peripheral circuit,
    wherein the current-sharing bus signal peripheral circuit is configured to amplify the current-sharing signal and provide the current-sharing signal to an external current-sharing bus.

4. The power supply unit as claimed in claim 1, further comprising:
    a switch drive circuit, configured to receive the control signal, and control at least one switch component of the power converter through the control signal.

5. A power supply system with dynamic current sharing, comprising:
    a current-sharing bus, configured to provide a first current signal,
    a plurality of power supply units, connected to each other through the current-sharing bus; wherein each power supply unit comprises a local current bus configured for providing a second current signal; each power supply unit comprises a control processor, and the control processor comprises:
    an active current-sharing unit, configured to receive the first current signal and the second current signal, and compare the second current signal with the first current signal to generate a compensation voltage,
    an average current unit, configured to receive the first current signal and the second current signal, and compare an average value of the first current signal with an average value of the second current signal to generate an average voltage,
    a droop current unit, configured to receive the second current signal to generate a droop compensation voltage, and
    an integration calculation unit, configured to receive the compensation voltage, the average voltage, and the droop compensation voltage to make output currents of the power supply units be approximately equal according to the compensation voltage, the average voltage, and the droop compensation voltage.

6. The power supply system with dynamic current sharing as claimed in claim 5, wherein the integration calculation unit generates a reference voltage to control an output voltage of the power supply unit so that the output currents of the power supply units are approximately equal.

7. The power supply system with dynamic current sharing as claimed in claim 6, wherein each control processor further comprises:
    a control signal generation unit, configured to receive the reference voltage and the output voltage, and generate a control signal according to the reference voltage and the output voltage to control the output voltage of the power supply unit.

8. The power supply system with dynamic current sharing as claimed in claim 6, wherein the control signal generation unit comprises:
    an output voltage comparison unit, configured to receive the reference voltage and the output voltage, and calculate an output voltage difference between the reference voltage and the output voltage, and
    a control signal generator, configured to receive the output voltage difference, and generate the control signal according to the output voltage difference.

9. The power supply system with dynamic current sharing as claimed in claim 5, wherein the active current-sharing unit comprises:
    a voltage comparison unit, configured to receive the first current signal and the second current signal, and calculate a current difference between the first current signal and the second current signal, and
    a compensation unit, configured to receive the current difference, and calculate the current difference to generate the compensation voltage.

10. The power supply system with dynamic current sharing as claimed in claim 9, wherein the greater the current difference, the greater the compensation voltage; the smaller the current difference, the smaller the compensation voltage.

11. The power supply system with dynamic current sharing as claimed in claim 9, wherein the compensation unit is a proportional-integral controller for performing proportional and integral calculations to the compensation voltage.

12. The power supply system with dynamic current sharing as claimed in claim 5, wherein the average current unit comprises:
    a first average current calculation unit, configured to receive the first current signal, and calculate an average value of the first current signal as a first current average value,
    a second average current calculation unit, configured to receive the second current signal, and calculate an average value of the second current signal as a second current average value, and
    an average current difference calculation unit, configured to receive the first current average value and the second current average value, and calculate a difference value between the first current average value and the second current average value to generate the average voltage.

13. The power supply system with dynamic current sharing as claimed in claim 5, wherein the droop current unit comprises:
    a droop function calculation unit, configured to receive the second current signal, and generate the droop compensation voltage according to the magnitude of the second current signal.

14. The power supply system with dynamic current sharing as claimed in claim 5, wherein the magnitude of the first current signal is equal to the maximum value of the plurality of second current signals.

* * * * *